US009638866B2

(12) United States Patent
Ratcliffe et al.

(10) Patent No.: US 9,638,866 B2
(45) Date of Patent: May 2, 2017

(54) OPTICAL FIBRE QUICK CONNECT BOX

(71) Applicant: Sondex Wireline Limited, Yately (GB)

(72) Inventors: James David Ratcliffe, Farnborough (GB); Timothy Gill, Farnborough (GB); Neil Geoffrey Harris, Farnborough (GB); Christopher Paul Hamblin, Farnborough (GB)

(73) Assignee: Sondex Wireline Limited, Yateley, Hampshire (GB)

( * ) Notice: Subject to any disclaimer, the term of this patent is extended or adjusted under 35 U.S.C. 154(b) by 0 days.

(21) Appl. No.: 14/843,760

(22) Filed: Sep. 2, 2015

(65) Prior Publication Data

US 2017/0059782 A1    Mar. 2, 2017

(51) Int. Cl.
*G02B 6/36* (2006.01)
*G02B 6/38* (2006.01)
*G02B 6/00* (2006.01)

(52) U.S. Cl.
CPC ......... *G02B 6/3616* (2013.01); *G02B 6/3821* (2013.01); *G02B 6/3825* (2013.01); *G02B 6/3897* (2013.01)

(58) Field of Classification Search
CPC .. G02B 6/3616; G02B 6/3821; G02B 6/3825; G02B 6/3652; G02B 6/3897; G02B 6/4439

USPC ...................................... 385/53–78, 134–139
See application file for complete search history.

(56) References Cited

U.S. PATENT DOCUMENTS 5,689,598 A    11/1997   Dean et al.
2007/0263961 A1*  11/2007   Khemakhem ........ G02B 6/3817
                                                         385/75

OTHER PUBLICATIONS

Molex: "SnapMate Optical Interconnect System", Jan. 1, 2014, pp. 1-2, http://www.literature.molex.com/sqlimages/kelmscott/molex/pdf_images/987651-1402.pdf.
European Patent Application No. 16185256.1-1553, Extended European Search Report, mailed Jan. 25, 2017.

* cited by examiner

*Primary Examiner* — Akm Enayet Ullah
*Assistant Examiner* — Michael Mooney
(74) *Attorney, Agent, or Firm* — Crowe & Dunlevy, P.C.

(57) ABSTRACT

A mechanism for securing a series of fiber optic cable connectors includes a base that has several connector recesses and a lid that is removably attached to the base. The mechanism may be used to ruggedly connect a series of fiber optic cables in a downhole instrument where space is limited, with the ability to break each of the series of fiber optic cables individually.

14 Claims, 5 Drawing Sheets

OPTICAL FIBRE QUICK CONNECT BOX

FIELD OF THE INVENTION

This application relates generally to instruments and sensors useable in a downhole environment, and more particularly, but not by way of limitation, to a mechanism for connecting fibre optic cable used to carry signals to and from the instruments and sensors.

BACKGROUND

Fibre optic cable is used in a wide variety of applications to carry data. Fibre optic cable often includes one or more optical fibres that may be individually wrapped in a plastic sheath and then collectively contained within a protective jacket. The use of fibre optic cable in data transmission applications has expanded significantly in recent decades as a result of advantages in transmission speeds and bandwidth provided by fibre cables.

However, unlike common electrical cables, connecting optical fibre cables presents challenges. Each optical fibre connection may contribute to unwanted signal attenuation (insertion loss) and reflection (return loss). Efforts to minimize these losses have produced a number of optical fibre connections, including the common "LC," "SC" and "ST" connectors. Although widely adopted and continually refined, these fibre connectors remain poorly suited for use in applications with severe space limitations, where multiple fibre connections are required at the same point. Connectors exist with multiple fibre channels; however, during maintenance all of the fibre channels are broken, this may lead to dirt or contaminants on the fibre end faces. To ensure minimal losses each channel must then be carefully cleaned, drastically increasing the amount of time needed for maintenance, if, for example, only one channel needed maintenance. Accordingly, there is a need for an improved mechanism for connecting and rigidly securing multiple fibre optic cables in a small space envelope, but still being able to individually make and break each connection during servicing.

SUMMARY OF THE INVENTION

Embodiments of the present invention include a mechanism for securing a series of fiber optic cables. The mechanism includes a base that has a connector recess and a lid that is removably attached to the base.

In another aspect, some embodiments include a downhole instrument for measuring a condition in an underground wellbore. The downhole instrument includes multiple input fibre optic cables, multiple output fibre optic cables and a connection box providing a secure connection between the fibres. The connection box includes a base that includes several connector recesses, one or more fibre optic connectors secured within the connector recess and a lid that is removably attached to the base. The connection box may have a flat surface, making it suitable for mounting directly to a chassis or PCB in a downhole instrument.

DETAILED DESCRIPTION OF THE EXEMPLARY EMBODIMENTS

Figure 1:
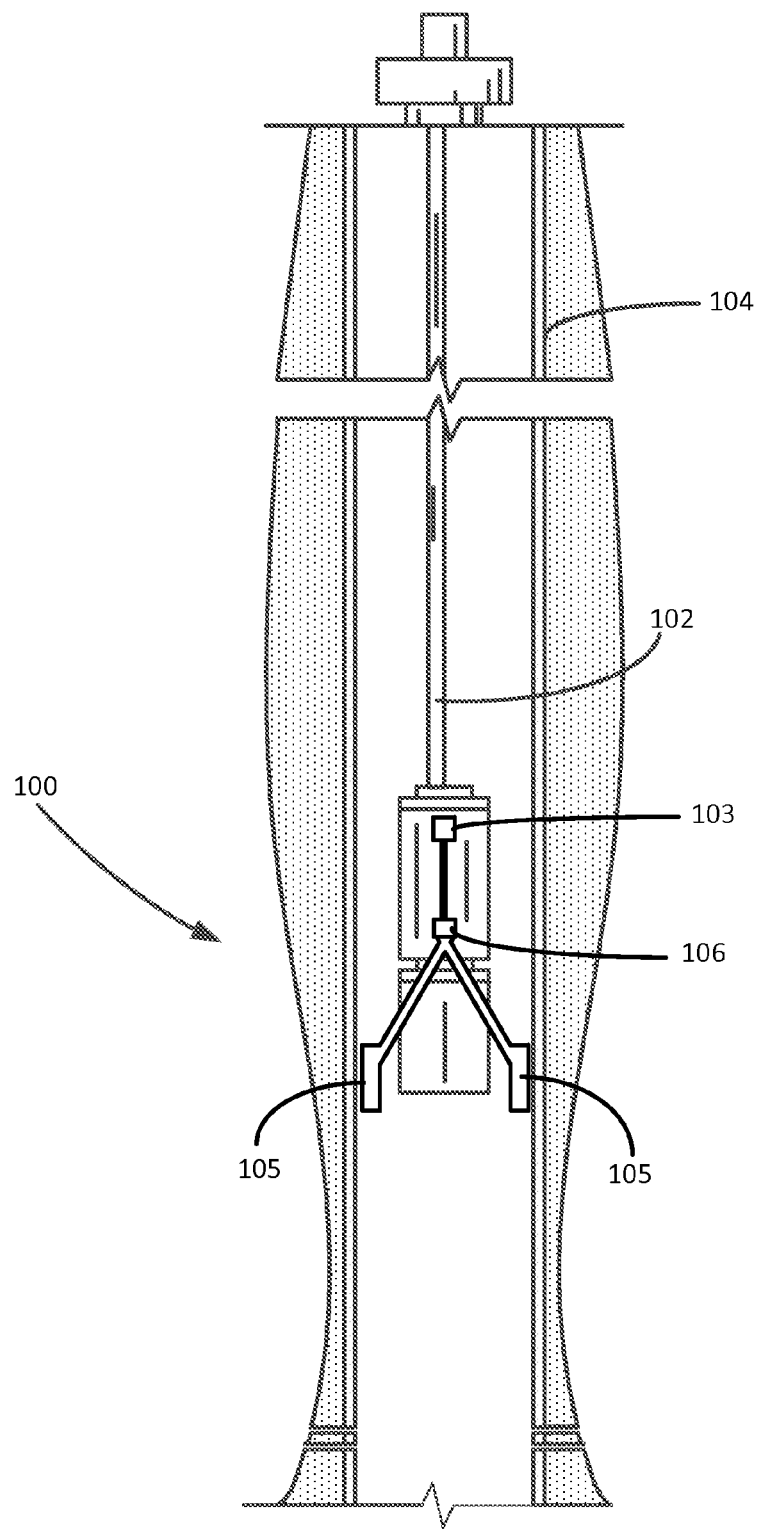
FIG. 1 is an elevational view of a downhole instrument constructed in accordance with an exemplary embodiment.

In accordance with an exemplary embodiment of the present invention, FIG. 1 shows an elevational view of a downhole instrument 100 attached to a deployment cable 102. The downhole instrument 100 and deployment cable 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The downhole instrument 100 contains an array of light emitting devices 103 that pass signals to an array of fibre optic sensors 105. In an embodiment, there is a connection box 106 which passes the signals between the light emitting devices 103 and the sensors 105.

Figure 2:
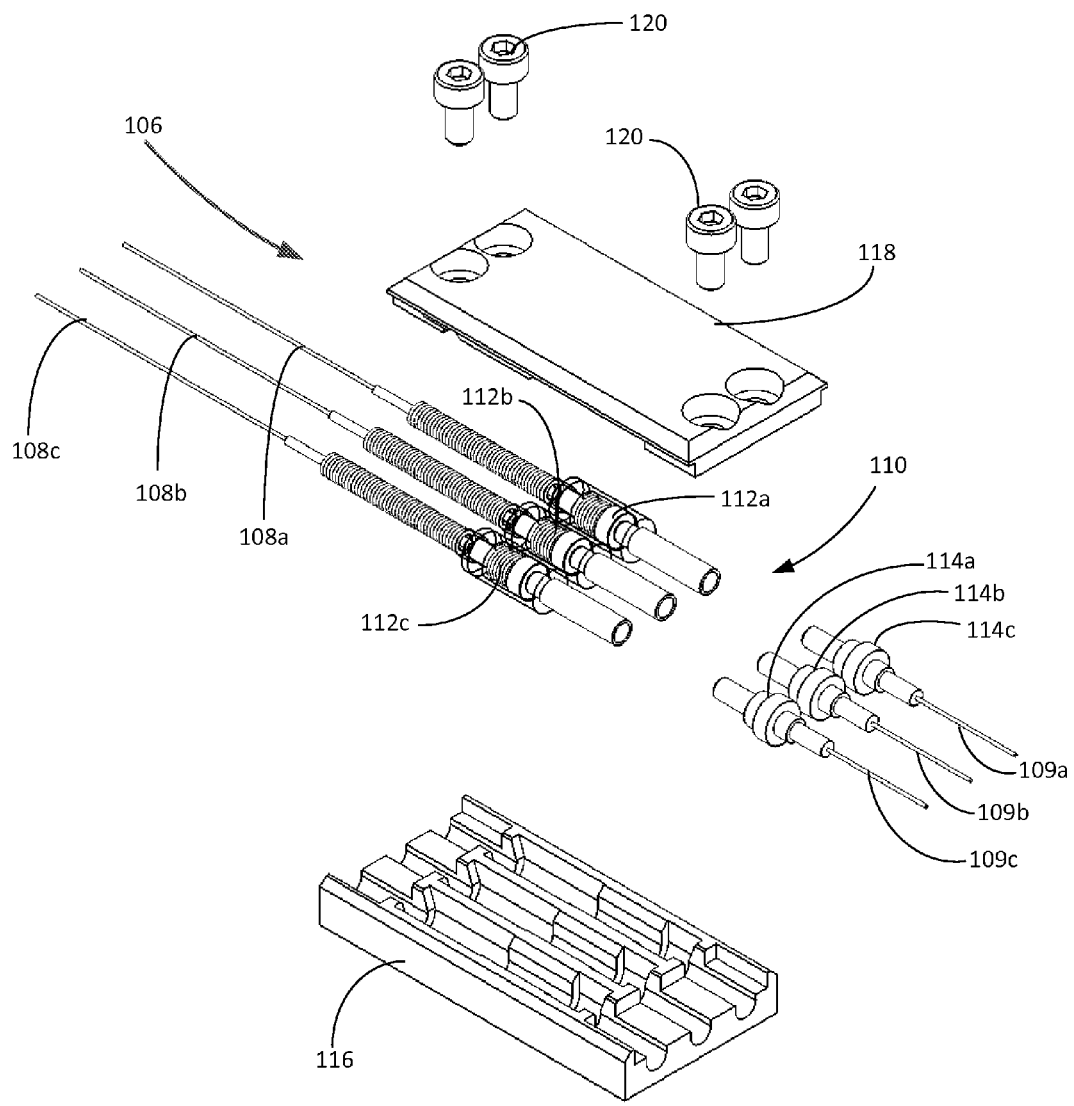
FIG. 2 is a perspective exploded view of a fibre optic cable connection box constructed in accordance with an embodiment.

Turning to FIG. 2, shown therein is a perspective, exploded view of the connection box 106, three fibre optic input cables 108*a*, 108*b*, 108*c*, three fibre optic output cables 109*a*, 109*b*, 109*c*, and three fibre optic cable connectors 110*a*, 110*b*, 110*c*. Each of the fibre optic cable connectors 110*a*, 110*b* and 110*c* includes a spring loaded receiver 112 and a mating plug 114. Commercially available spring-biased connectors are offered by a number of companies, including AT&T under the "ST" brand. Although three fibre optic input cables 108, three fibre optic output cables 109, and three fibre optic cable connectors 110 are shown in FIG. 2, it will be understood that the connection box 106 can be configured to contain greater or fewer numbers of fibre optic cables and cable connectors. It will further be appreciated that the connection box 106 can be used to house other types of cable connectors.

Figure 3:
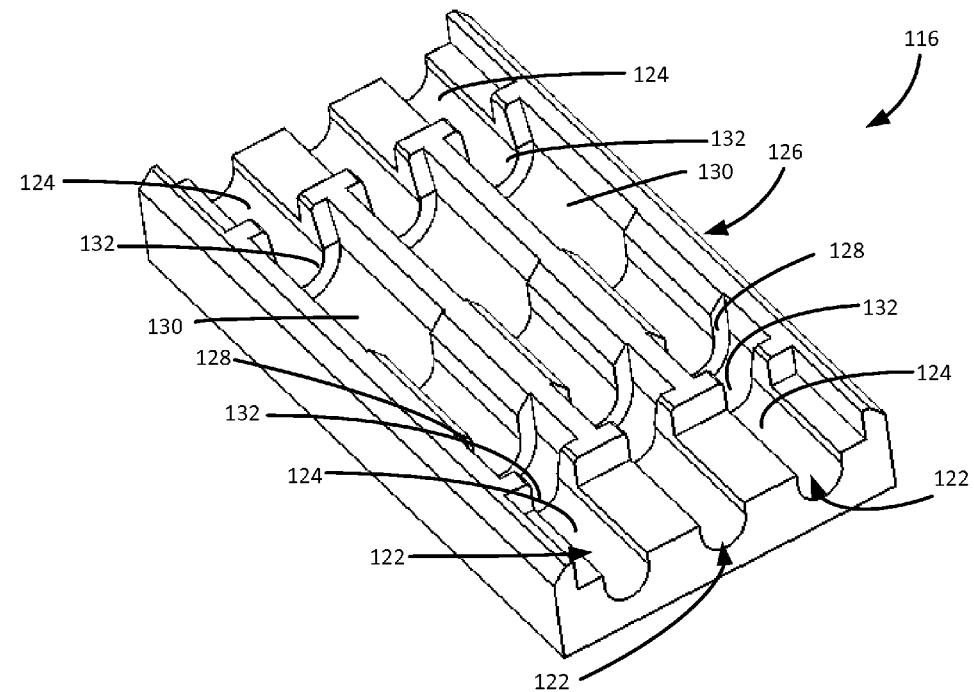
FIG. 3 is a perspective view of the base of the connection box of FIG. 2.
Figure 4:
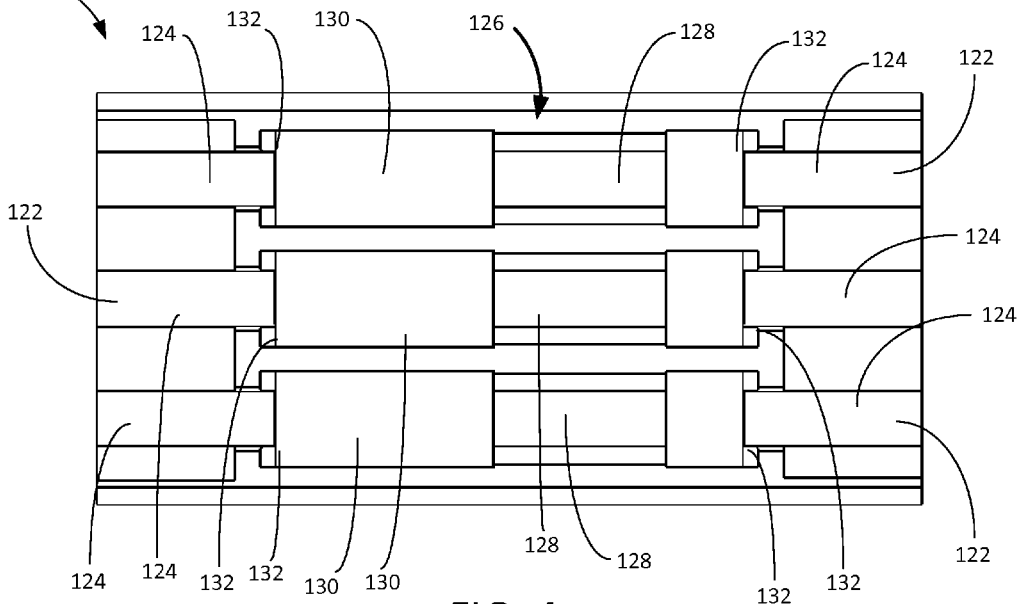
FIG. 4 is a top view of the base of the connection box of FIG. 2.

The connection box 106 further includes a base 116 and a lid 118. Optional fasteners 120 can be used to secure the lid 118 to the base 116. Turning to FIGS. 3 and 4, shown therein are perspective and top views, respectively, of the base 116. The base 116 includes a plurality of channels 122 that are each sized and configured to capture and retain a separate one of the fibre optic input cables 108, fibre optic output cables 109 and fibre optic cable connectors 110. In the embodiment depicted in FIGS. 3 and 4, the base 116 includes three channels 122. Each channel 122 includes a pair of line recesses 124 on opposite sides of a connector recess 126. The line recesses 124 are configured to capture and secure the one of the fibre optic input cables 108 or fibre optic output cables 109, and the connector recess 126 is sized and configured to tightly secure a separate one of the fibre optic cable connectors 110. In the embodiment depicted in FIGS. 3 and 4, each of the connector recesses 126 includes a separate plug recess 128 to receive the plug 114 and a separate receiver recess 130 configured to secure the receiver 112.

In some embodiments, the base 116 is manufactured from a plastic or synthetic rubber material that provides a limited degree of flexibility when exposed to the application of force. For applications of extreme vibrations, the plug recess 128 and receiver recess 130 are each sized such that they are substantially the same size or nominally smaller in an unstressed state than the respective plug 114 and receiver 112. When the plug 114 and receiver 112 are connected and pressed into the respective connector recesses 126 within the base 116, the connector recesses 126 apply a compressive force that holds the fibre optic cable connectors 110 in place. Thus, in some embodiments, the plug recess 128 and receiver recess 130 are configured such that the plug 114 and receiver 112 can be snapped into a secure fit within the base 116.

Figure 5:
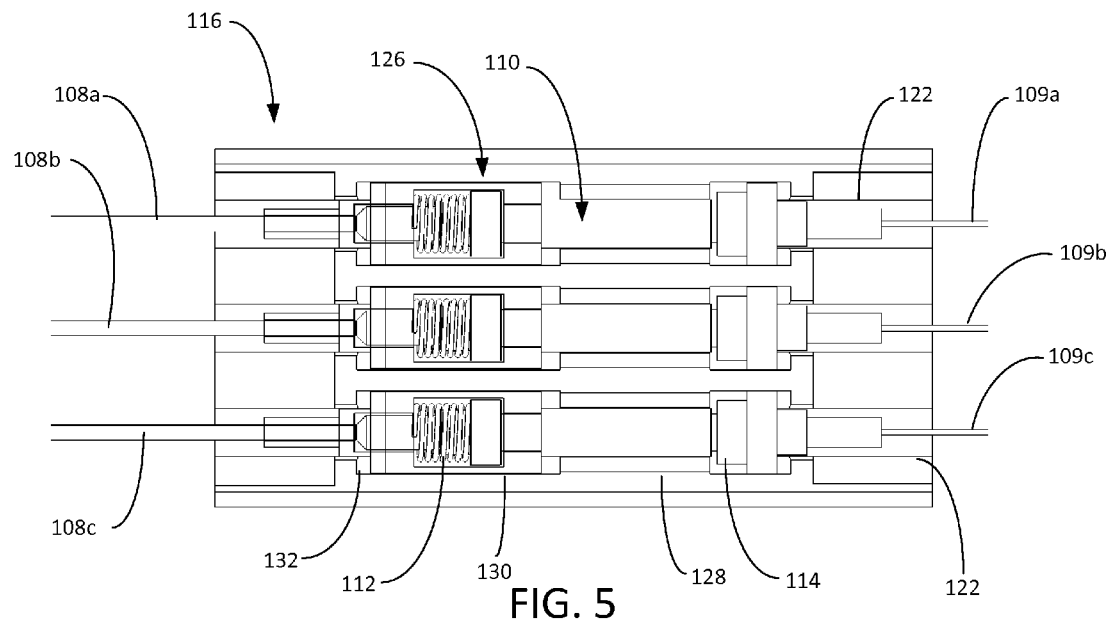
FIG. 5 is a top view of the base of the connection box of FIG. 2 with fibre optic cables and cable connectors.

Notably, each receiver recess 130 and plug recess 128 includes a sloped face 132 that faces the interior portion of the base 116. The sloped face 132 urges the plug 114 and receiver 112 toward the interior of the base 116 when these components are pushed into their respective recesses within the base 116. The application of inward forces on the plug 114 and receiver 112 ensures that the fibre optic cable connector 110 maintains a secure connection in high vibration conditions by pre-loading the spring within the receiver 112 to a desired extent. FIG. 5 presents a top view of the fibre optic cable connectors 110 captured within the connector recesses 126 within the base 116.

Figure 6:
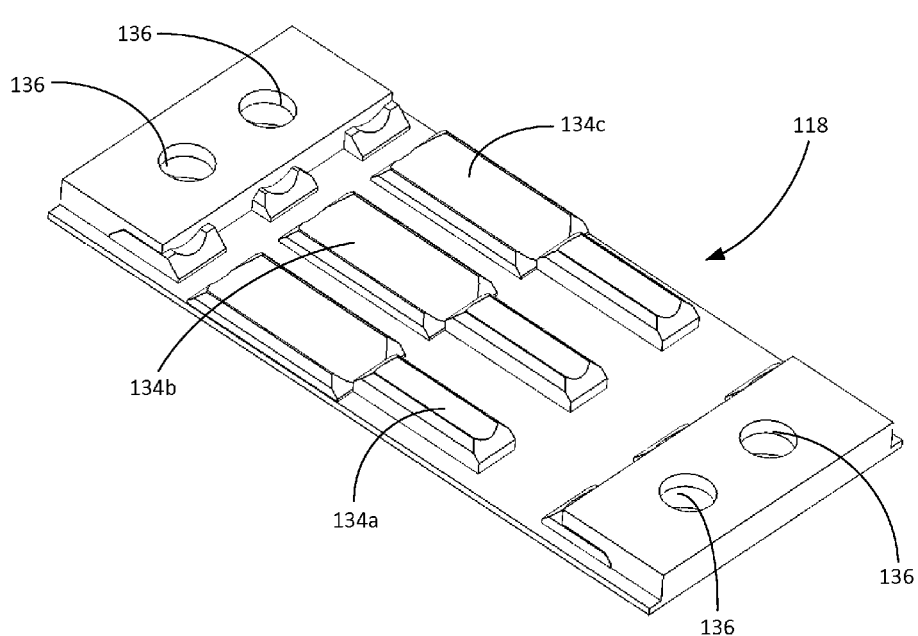
FIG. 6 is a bottom view of the lid of the connection box of FIG. 2.
Figure 7:
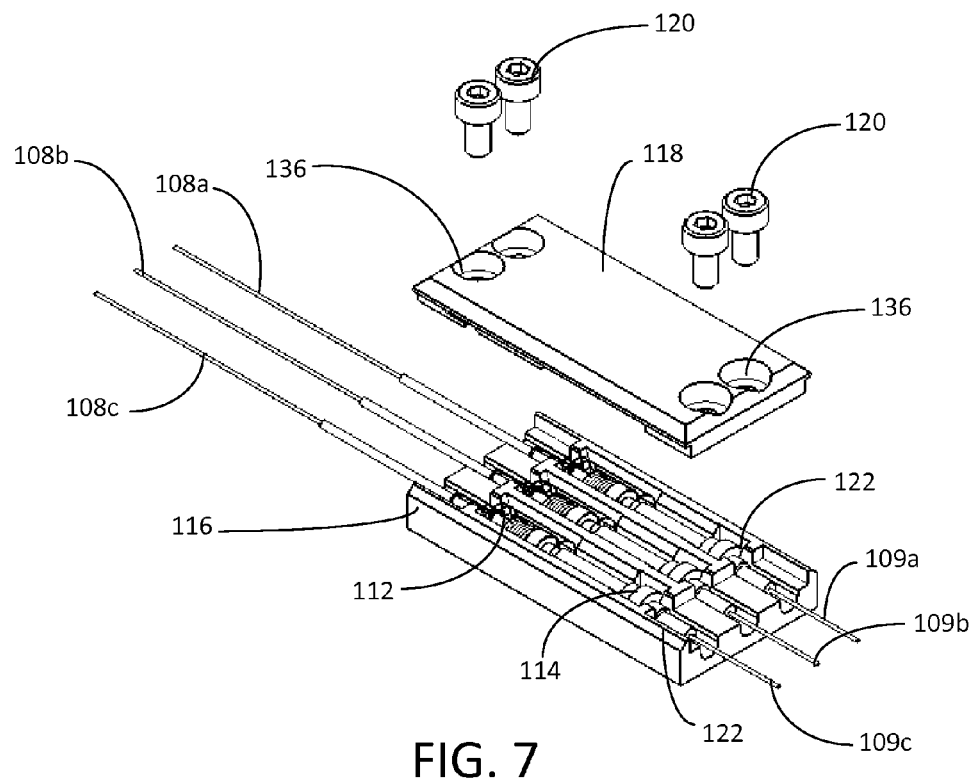
FIG. 7 is a perspective exploded view of a fibre optic cable connection box of FIG. 2 with the fibre optic cables and cable connectors.
Figure 8:
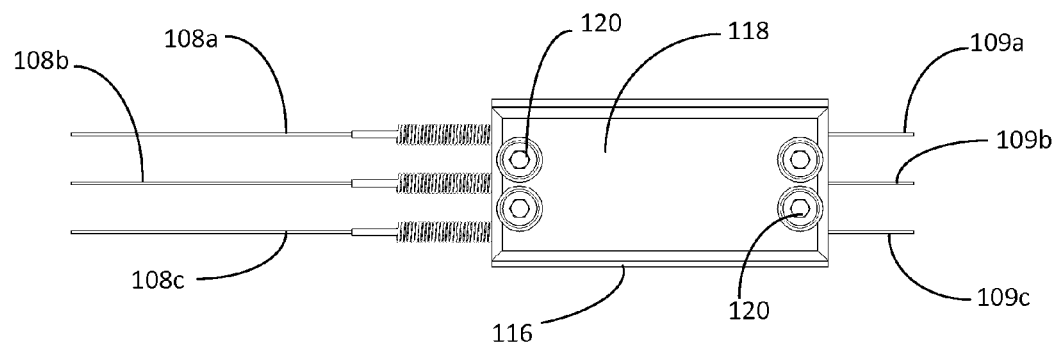
FIG. 8 is a top view of the fibre optic cable connection box in a closed position.

Turning to FIG. 6, shown therein is a view of the underside of the lid 118. The lid 118 includes three connector cradles 134a, 134b and 134c that are intended to capture the fibre optic connectors 110a, 110b and 110c within the base 116. The lid 118 also includes fastener bores 136 that accept the fasteners 120. In a first embodiment, the fasteners 120 are used to secure the lid 118 to the base 116. The fasteners may also be used to secure the connection box 106 to the downhole instrument 100. In a second embodiment, the lid 118 and base 116 are configured for a snap-fit connection in which the lid 118 and base 116 include mating lips that releasably secure the separate parts of the connection box 106. FIGS. 7 and 8 present perspective views of the connection box 106 in open and closed conditions.

Thus, the connection box 106 provides an improved mechanism for securing the fibre optic cable connectors 110, fibre optic input cables 108 and fibre optic output cables 109. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention. For example, it may be desirable to make use of the connection box 106 for securing fibre optic connections in other applications and environments, including, for example, in aeronautical, automotive and manufacturing systems.

What is claimed is:

1. A mechanism for securing a fibre optic cable connector, the mechanism comprising:
   a base, wherein the base includes a connector recess and wherein the connector recess is compliant and nominally smaller than the fibre optic cable connector in an unstressed state; and
   a lid, wherein the lid is removably attached to the base.

2. The mechanism of claim 1, wherein the fibre optic cable connector includes a receiver and a plug and wherein the connector recess includes a receiver recess and a plug recess.

3. The mechanism of claim 2, wherein the receiver recess includes a sloped face that urges the receiver against the plug as the fibre optic cable connector is inserted into the connector recess.

4. The mechanism of claim 3, wherein the plug recess includes a sloped face that urges the plug against the receiver as the fibre optic cable connector is inserted into the connector recess.

5. The mechanism of claim 1, wherein the base includes a flat form factor and is configured to be easily and securely attached to a flat mounting surface.

6. The mechanism of claim 1, wherein the mechanism further comprises one or more fasteners that secure the lid to the base.

7. A downhole instrument for measuring a condition in an underground wellbore, the downhole instrument comprising:
   a series of input fibre optic cables;
   a series of output fibre optic cable; and
   a connection box between the input and output fibre optic cables, wherein the connection box comprises:
      a base, wherein the base includes a connector recess;
      a fibre optic cable connector secured within the connector recess; and
      a lid, wherein the lid is removably attached to the base.

8. The downhole instrument of claim 7, wherein the connector recess in an unstressed state is nominally smaller than the fibre optic cable connector.

9. The downhole instrument of claim 7, wherein the fibre optic cable connector includes a receiver attached to the first fibre optic cable and a mating plug attached to the second fibre optic cable.

10. The downhole instrument of claim 9, wherein the receiver is spring-loaded.

11. The downhole instrument of claim 9 wherein the connector recess includes a receiver recess configured to accept the receiver and a plug recess configured to accept the plug.

12. The downhole instrument of claim 11, wherein the receiver recess includes a sloped face that urges the receiver against the plug as the fibre optic cable connector is inserted into the connector recess.

13. The downhole instrument of claim 11, wherein the plug recess includes a sloped face that urges the plug against the receiver as the fibre optic cable connector is inserted into the connector recess.

14. The downhole instrument of claim 7, further comprising a plurality of connector recesses.

* * * * *